(12) United States Patent
Bach et al.

(10) Patent No.: US 7,477,155 B2
(45) Date of Patent: Jan. 13, 2009

(54) ANIMAL CONTAINMENT SYSTEM WITH MONITOR

(76) Inventors: Eric David Bach, 10 Roberts Rd., Newtown Square, PA (US) 19073; Steven E. Bach, 10 Roberts Rd., Newtown Square, PA (US) 19073

( * ) Notice: Subject to any disclaimer, the term of this patent is extended or adjusted under 35 U.S.C. 154(b) by 30 days.

(21) Appl. No.: 11/642,610

(22) Filed: Dec. 19, 2006

(65) Prior Publication Data
US 2007/0096929 A1 May 3, 2007

Related U.S. Application Data

(63) Continuation-in-part of application No. 10/271,022, filed on Oct. 15, 2002, now Pat. No. 7,173,535.

(51) Int. Cl.
*G08B 23/00* (2006.01)
(52) U.S. Cl. .................................. 340/573.3
(58) Field of Classification Search ............. 340/573.1, 340/573.2, 573.4, 692, 539.1, 539.15, 825.49, 340/943; 119/712; 367/93, 94
See application file for complete search history.

(56) References Cited

U.S. PATENT DOCUMENTS

| 4,745,882 | A | 5/1988 | Yarnall |
| 5,218,344 | A * | 6/1993 | Ricketts .................... 340/573.4 |
| 5,353,744 | A | 10/1994 | Custer |
| 5,381,129 | A | 1/1995 | Boardman |
| 5,460,124 | A | 10/1995 | Grimsley |
| 5,844,489 | A | 12/1998 | Yarnall |
| 5,949,350 | A | 9/1999 | Girard |
| 6,151,276 | A | 11/2000 | Peinetti |
| 6,163,261 | A | 12/2000 | Westrick |
| 6,230,661 | B1 | 5/2001 | Yarnall |
| 6,271,757 | B1 | 8/2001 | Touchton |
| 6,657,544 | B2 | 12/2003 | Barry |
| 7,173,535 | B2 * | 2/2007 | Bach et al. ................ 340/573.3 |
| 2003/0122678 | A1 | 7/2003 | Duncan |

* cited by examiner

*Primary Examiner*—Phung Nguyen
(74) *Attorney, Agent, or Firm*—Steven E. Bach

(57) ABSTRACT

A system is provided for containing an animal in a defined area. The system comprises first, second, and third communicating units. One of the first two units defines a containment area, and the other unit is operatively associated with the animal. One of the first two units transmits an ultrasonic timing signal at a periodic interval, and the other unit receives the timing signal, and determining a distance between the first and second units. If the distance corresponds to the animal being outside the containment area, one of the first two units generates a warning signal. A third unit monitors whether or not the animal is within the defined area.

7 Claims, 6 Drawing Sheets

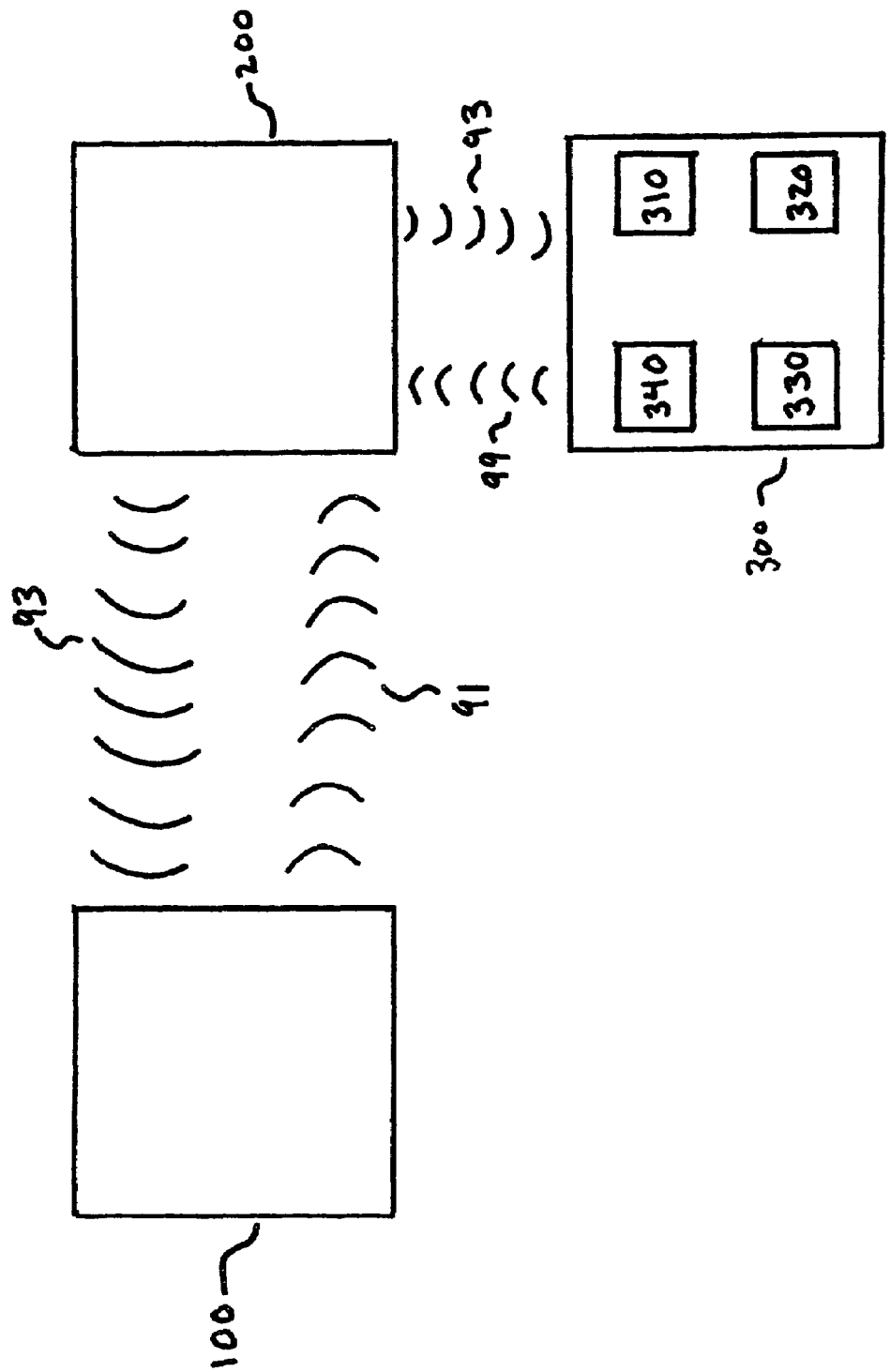

ANIMAL CONTAINMENT SYSTEM WITH MONITOR

RELATED APPLICATIONS

This application is a continuation-in-part of U.S. patent application Ser. No. 10/271,022 filed Oct. 15, 2000 now U.S. Pat. No. 7,173,535, and claims priority thereof.

BACKGROUND

It is often desirable to contain an animal within a particular area for one or more reasons, including but not limited to: protection of the animal, protection of people and other animals from the animal, and convenience. Various systems have been devised for containing an animal. Fences are sometimes used to contain an animal, but they are expensive, require ongoing maintenance, are fixed in location, and are permanent. Also, fences may not be appropriate for all terrain, may not be aesthetically pleasing, and do not provide notification when an animal leaves the containment area. A buried line that interacts with an animal collar to shock the animal if it crosses the line addresses the aesthetic problem of the fence, but it too is expensive, fixed in location, permanent, and does not provide notification when an animal leaved the containment area. A chain anchored at one end and attached to an animal at the other end is inexpensive and may be portable by using a stake or the like for an anchor. Chains, however, may easily become entangled in obstructions, may be inconvenient to attach to the animal, may not be esthetically pleasing, and do provide notification when an animal leaved the containment area.

SUMMARY

A system is provided for containing an animal in a defined area. The system comprises first, second, and third communicating units. A first unit, which is mobile, defines a containment area. A second unit is operatively associated with the animal. One of the first and second units transmits an ultrasonic timing signal at a periodic interval, and the other unit receives the timing signal, measures the time of transmission for the timing signal, and calculates a distance between the first and second units using the time of transmission and the propagation rate of the timing signal. If the distance corresponds to the animal being outside the containment area, one of the first and second units generates a warning signal. A third unit monitors whether or not the animal is within the defined area and alerts a person if the animal is outside the containment area. The third unit may detect the warning signal or another generated by the first unit or the second unit to identify the status of the animal relative to the containment area (i.e., whether the animal is inside or outside of the containment area).

DRAWINGS

The accompanying drawings, which are incorporated in and form a part of the specification, illustrate exemplary embodiments of the invention, and, together with the description serve to explain the principles of the invention.

FIG. 8 is a block diagram of a system for containing an animal in a defined area according to yet another alterative exemplary embodiment of the invention.

DETAILED DESCRIPTION

Figure 1:
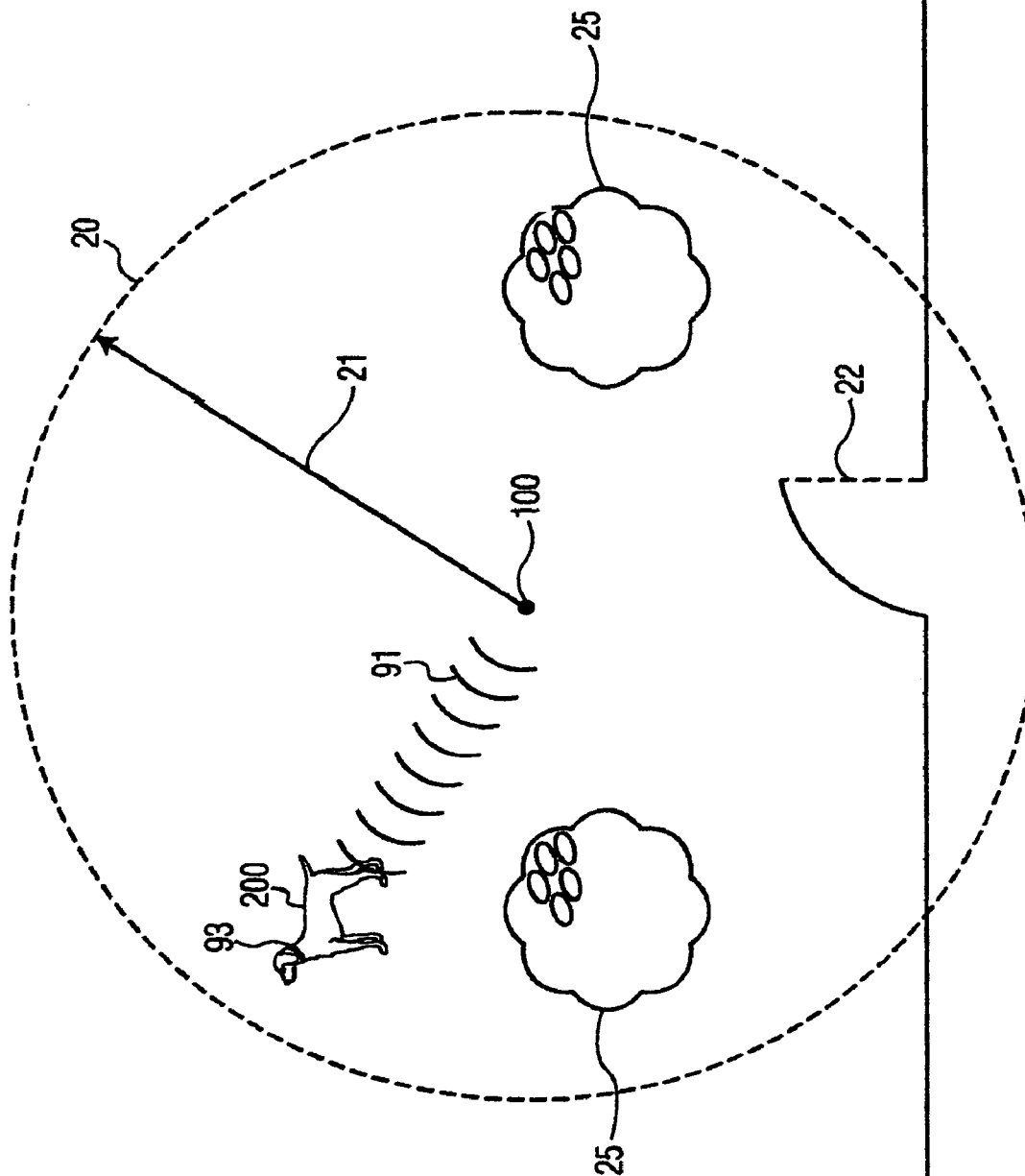
FIG. 1 shows an animal contained in an area by a system according to an exemplary embodiment of the present invention.

In describing the invention illustrated in the drawings, specific terminology is used for the sake of clarity. However, the invention is not intended to be limited to the specific terms so selected, and it is to be understood that each specific term includes all technical equivalents which function in a similar manner to accomplish a similar purpose.

With reference to the drawings in general and FIGS. 1-4 in particular, an apparatus and method are provided for containing an animal within a defined area.

A first unit 100 transmits a timing signal 91 at a predetermined time interval. A second unit 200 receives the signal and measures either the time of transmission of the signal or the change in the time of transmission of the signal. In an exemplary embodiment illustrated in FIG. 1, first unit 100 is positioned to locate an area 20 in which an animal 10 is to be contained, and a second unit 200 is operatively associated with animal 10. Area 20 may be, for example, a circle centered at first unit 100 and having a radius 21, as shown in FIG. 1. First unit 100 may be set, held, or fixed at a desired location to define the center of area 20. In an exemplary embodiment, first unit 100 is connected to a stake or the like driven into the ground to fix first unit 100 at a desired location. In another exemplary embodiment, first unit is attached to a wearable article such as a wrist band or the like, held or worn by a person 11 (shown in FIG. 3) or otherwise connected to a person 11, thereby defining area 20 as a circle centered at the person wearing first unit 100 and movable with that person. It will be apparent to those skilled in the art that an area may be defined having a geometry other than a circle, but such geometry would require more than one first unit 100.

Timing signal 91 may be any of a variety of signals which can be transmitted over a distance of a few feet to 50 feet or more and which propagate at a known, fixed rate. In an exemplary embodiment, timing signal 91 is an ultrasonic signal having a frequency between about 40 and 60 kilohertz (KHz), which propagates at a rate of about 1 foot per millisecond (1 ft/ms). Timing signal 91 is transmitted in a 360 degree arc as will be described hereafter.

Figure 2:
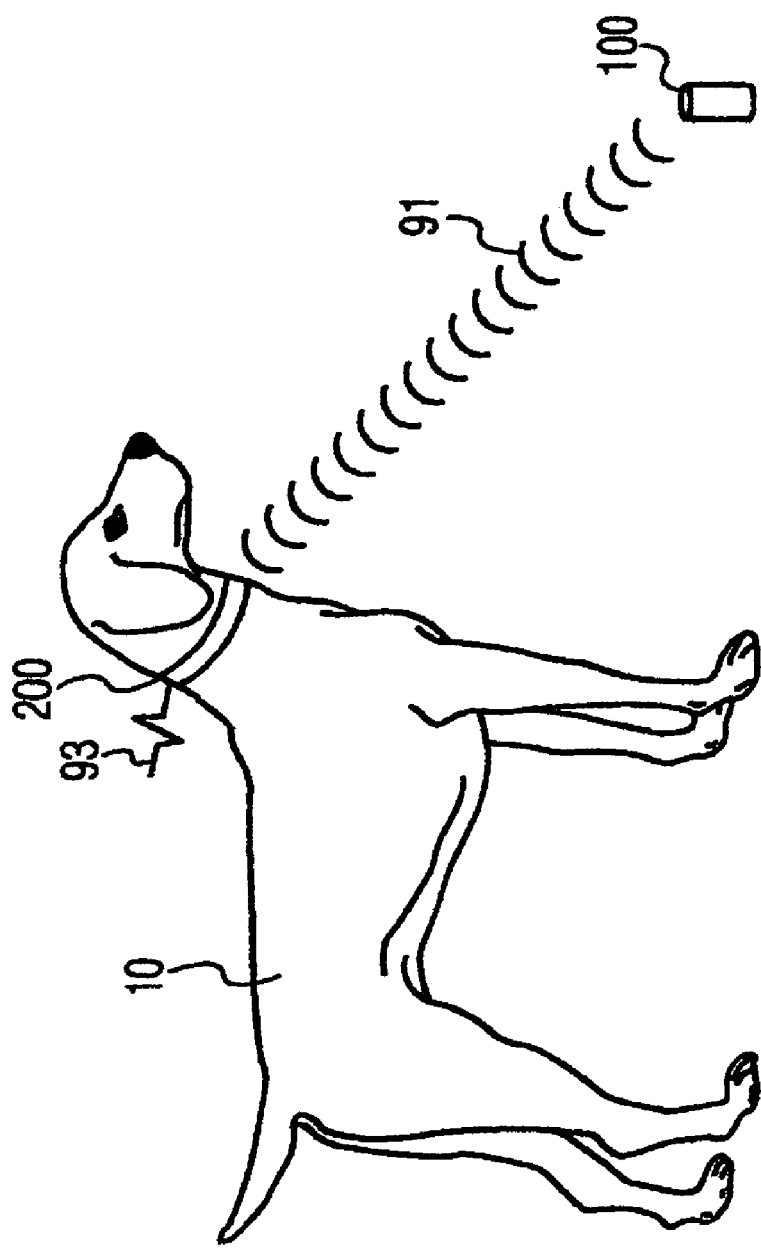
FIG. 2 shows an apparatus according to an exemplary embodiment of the present invention having a fixed first unit defining a containment area and a second unit operatively associated with an animal.
Figure 3:
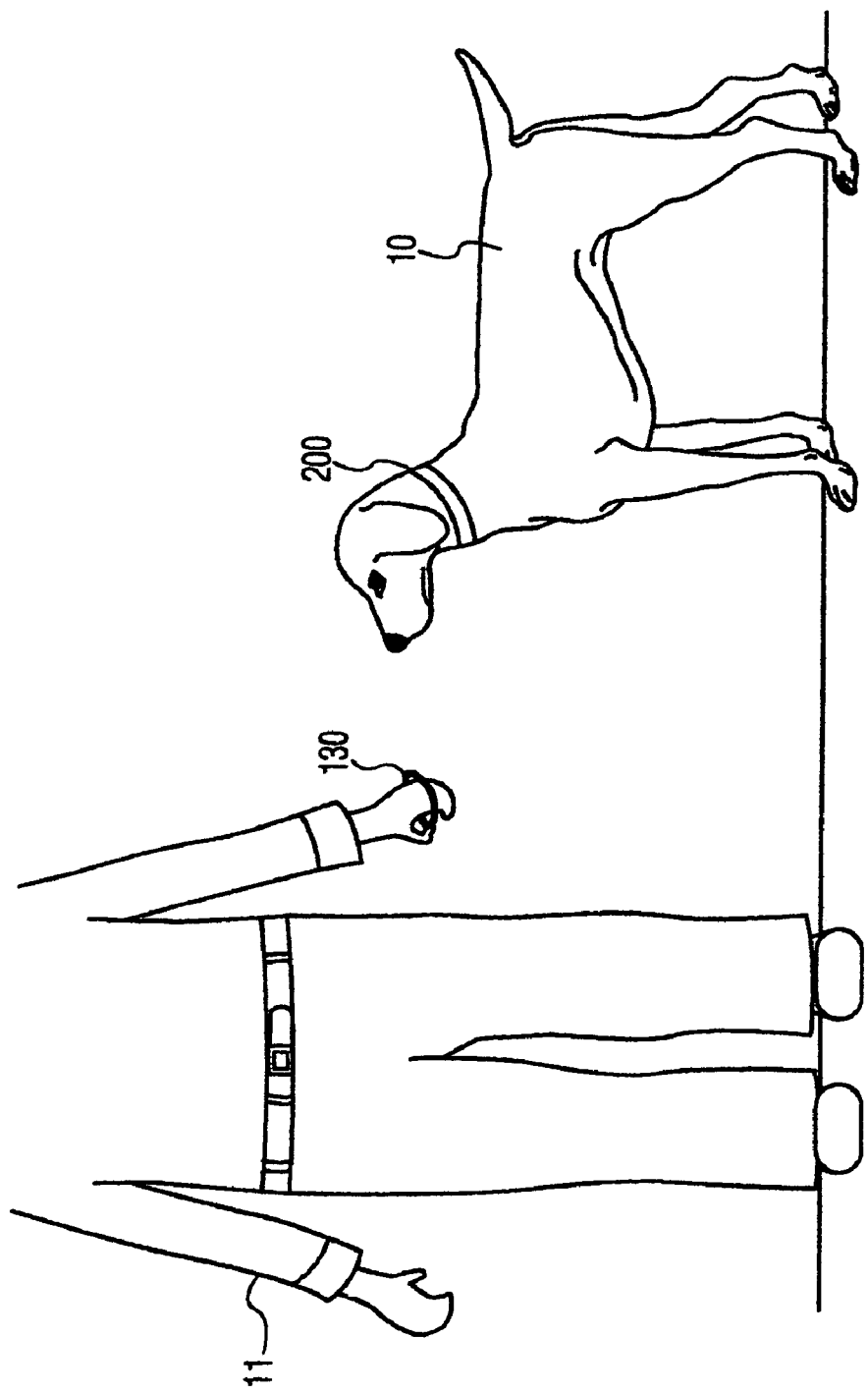
FIG. 3 shows an apparatus according to an exemplary embodiment of the invention having a mobile first unit defining a containment area and a second unit operatively associated with an animal.

As shown in FIG. 2, second unit 200 may be operatively associated with animal 10 by incorporating second unit 200 in a collar placed on the animal 10, attaching second unit 200 to a collar, implanting second unit 200 below the skin of animal 10, or the like. As illustrated in FIG. 2, first unit 100 is fixed to the ground by a stake. As stated previously, second unit 200 measures either the time taken for signal 91 to propagate from first unit 100 to second unit 200 (i.e., transmission time) or the difference in transmission time compared to a reference time.

In an exemplary embodiment, the second unit 200 measures the transmission time. The measured transmission time is compared to a set or threshold time corresponding to a distance equal to radius 21 of area 20. If the measured transmission time for transmission 91 corresponds to a distance equal to or greater than the radius 21 of area 20, then second unit 200 produces a corrective output or waning signal 93 to the animal 10. The warning signal 93 is adapted to urge animal 10 to return to area 20 to stop the warning signal. Exemplary warning signals include a high frequency sound audible to animal 10 but not to people and a mild electric pulse.

In the foregoing exemplary embodiments, signal 91 is transmitted from first unit 100 to second unit 200, and second unit 200 measures the time of transmission of signal 91. For second unit 200 to measure the time of transmission, second unit 200 must accurately identify the time when signal 91 is generated by first unit 100. This may be realized in a number of ways. First unit 100 may generate signal 100 as a function of when first unit 100 is activated which may in-turn be a function of second unit 200 or a third unit that turns on both first and second unit simultaneously with a common relatively instantaneous trigger, such as an rf signal.

Alternatively, first unit 100 and second unit 200 may comprise highly accurate clocks driven by, for example, crystal oscillators or the like and timing signal 91 may be generated at multiples of 100 ms. Moreover, second unit 200 may have a clock which resets to zero every 100 ms. Assuming the system is activated with the animal inside area 20 and radius 21 of area 20 is 50 feet or less, signal 91 will be received by second unit 200 at a time of 0 to 50 ms corresponding to a distance of 0-50 feet. For example, if signal 91 is received at second unit 200 at a time on the clock of second unit 200 of 20 ms, then the animal is 20 feet from first unit 100.

In yet another alternative embodiment, first unit 100 may be activated at a set or programmed distance from second unit 200. As shown in FIG. 1, first unit 100 may be positioned such that a door 22 is within area 20. First unit 100 and/or second unit 200 may be provided with a switch for switching first and/or second unit between an active and inactive state. This switch may be triggered, for example, by an action of a person or a proximate switch mounted at door 22. When animal 10 is inside the dwelling, first unit 100 may be switched off so that timing signal 91 does not propagate, and/or second unit 200 may be switched off so that warning signal 93 is not produced.

In an exemplary embodiment, door 22 is on the circle defining area 20, and second unit 200 is switched on when animal 10 exits door 22. When second unit 200 is activated, it establishing a baseline or reference time corresponding to radius 21. This reference time is used to determine whether second unit 200, and therefore animal 10, is closer or further from first unit 100 then when second unit 200 was activated.

For example, first unit 100 is positioned 45 feet from door 22. Second unit is activated when animal 10 is 5 feet inside door 22. Signal 91 is propagated at 100 ms intervals. Second unit 200 receives the first pulse of signal 91 after being activated and sets a second clock 230 (shown in FIGS. 4, 6, 7) to a reference time (i.e., $T_0$) establishing a timing baseline. If animal 10 remains stationary, then the second pulse of propagation signal 91 will be received 100 ms after the first pulse. If animal 10 moves toward first unit 100, then the second pulse of propagation signal 91 will be received less than 100 ms after the first pulse. Moreover, for each foot closer to first unit 100 that animal 10 moves the second pulse of timing signal 91 will be received by second unit 1 ms before the 100 ms interval. Thus, if animal 10 moves 3 feet closer to first unit 100 between the first and second pulse of timing signal 91, then the second pulse will be received at a time of 97 ms. If clock 230 is reset to zero at 50 ms and each 100 ms thereafter (corresponding to the original set distance of 50 feet and the timing interval of 100 ms, respectively), then the second pulse in the foregoing example would be received at a time of 47 ms corresponding to the distance of 47 feet between animal 10 and first unit 200.

Similarly, if animal 10 continues to move closer to first unit 100, the third pulse or propagation of signal 91 will be received at a time corresponding to a closer distance. For example, with the clock being reset as described above such that the time is equal to the distance between animal 10 and first unit 100, animal 10 moves 2 feet closer to first unit 100 between the second and third pulse of timing signal 91. The third pulse of timing signal 91 is received at a time of 45 ms, indicating that animal 10 is now 45 feet from first unit 100. Conversely, if animal 10 moves further away from first unit 100, the time that a particular pulse is received by second unit 200 will be greater. For example, if animal 10 has moved to a position 52 feet from first unit 100 by the tenth pulse, then, with the clock being reset as described above, the tenth pulse will be received at a time of 52 ms. If area 20 is set by a radius 21 of 50 feet, then second unit 200 will determine at the tenth pulse that animal 10 is outside of area 20 because $T_{10}>50$ ms. When the second unit determines that animal 10 is outside of area 20, warning pulse 93 is produced. In an exemplary embodiment, warning pulse 93 continues to be produced until animal 10 returns to area 20.

While second unit is active, animal 10 may move freely within area 20 without becoming entangled by obstacles 25 and without being encumbered by a chain or the like. Moreover, because timing signal 91 is an ultrasonic pulse, it can easily travel through and/or around many typical obstacles, such as shrubs, trees, and the like.

Figure 4:
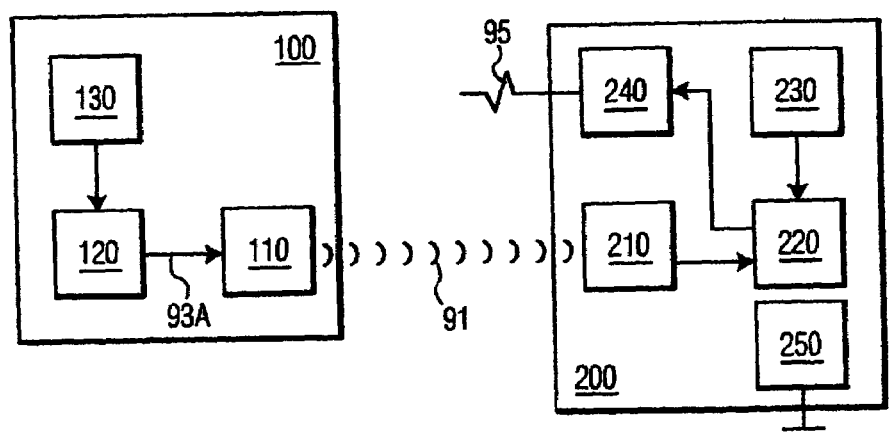
FIG. 4 is a block diagram of a system for containing an animal in a defined area according to an exemplary embodiment of the invention.

In an exemplary embodiment, illustrated in FIG. 4, first unit 100 comprises a transmitter 110 which transmits timing signal 91. In the exemplary embodiment, transmitter 110 is an ultrasonic speaker, however, transmitter 110 may be any component capable of transmitting a short duration signal over operative distances of a few feet to fifty feet or more depending upon the area 20 in which animal 10 is to be contained and at a consistent rate that can be easily measured.

In the embodiment illustrated in FIG. 4, first unit 100 also comprises a logic circuit 120 and a clock 130. Logic circuit 120 generates a signal 93A at regular intervals which are determined by clock 130. Signal 93A is a pulse of short duration, and is used to drive transmitter 100 to create signal 93 which is propagated from first unit 100 through the air. In an exemplary embodiment, signal 93A is generated at intervals of 100 ms, although the interval may vary according to the radius 21 of area 20 and the speed at which animal 10 typically moves.

Second unit 200 comprises a receiver 210, a logic circuit 220, a clock 230, and a warning signal device 240. Receiver 210 is compatible with transmitter 110 and is configured to receive signal 91. In an exemplary embodiment, receiver 210 is an ultrasonic microphone, which captures and amplifies signal 91 and sends the amplified signal to logic circuit 220.

Logic circuit 220 measures transmission time for signal 91 as the difference in time from a reference time when a pulse of signal 91 is propagated until the time when signal 91 is received using clock 230. As explained above, the reference time may be acquired in a variety of ways. When the transmission time exceeds a predetermined threshold for the desired radius 21 of area 20, logic circuit 220 activates warning signal device 240, which may be an electrical probe for delivering a shock to animal 10 or a speaker for generating a sound audible to animal 10, or any other device capable of generating a warning that may be perceived by animal 10 to effect correction. Logic circuit 220 may be activated and deactivated using a switch 250.

Figure 5:
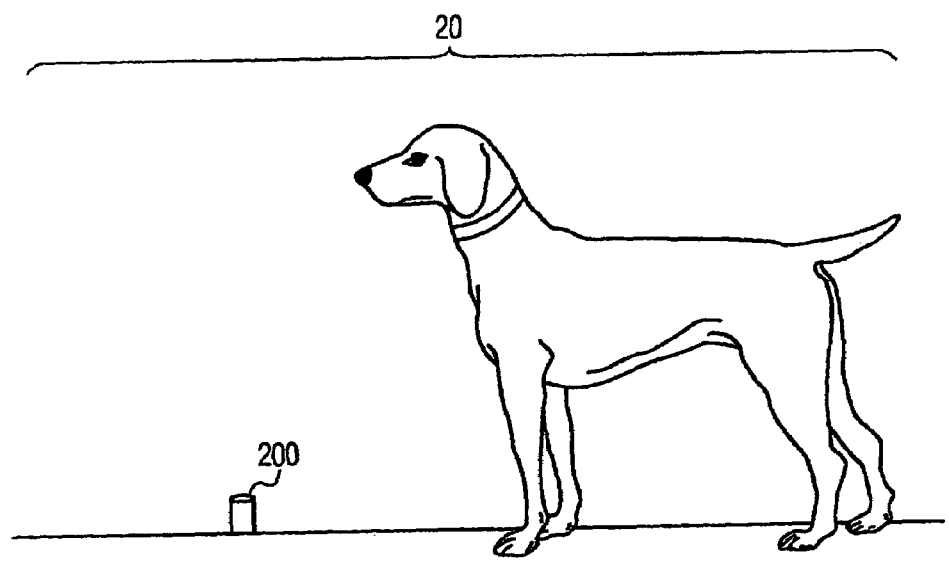
FIG. 5 shows an apparatus according to an exemplary embodiment of the invention having a second unit locating an area and a first unit operatively associated with an animal.
Figure 6:
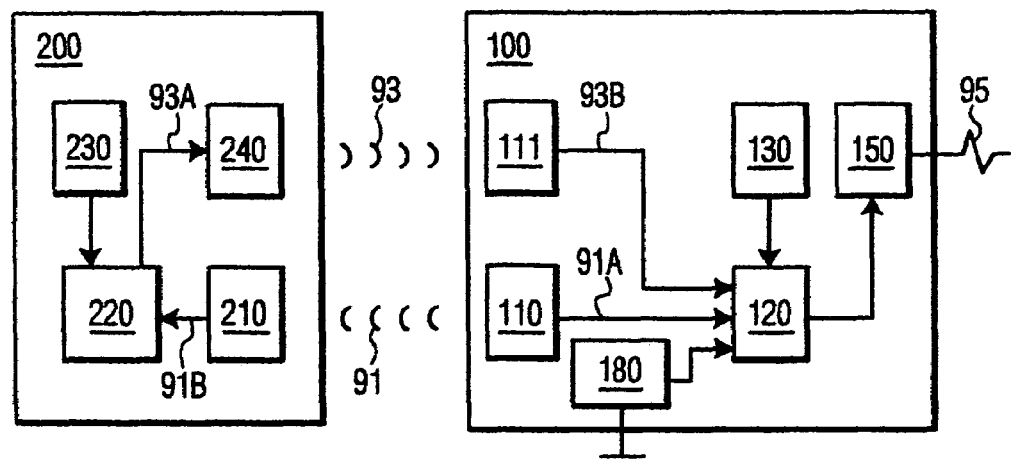
FIG. 6 is a block diagram of a system for containing an animal in a defined area according to an alterative exemplary embodiment of the invention.

In an alternate exemplary embodiment, as shown in FIGS. 5 and 6, first unit 100 is operatively associated with animal 10 and second unit 200 is positioned to locate area 20. As in the exemplary embodiment described above, a transmitter 110 in first unit 100 transmits timing signal 91, and a receiver 210 in second unit 200 receives signal 91. A logic circuit 220 in second unit 200 measures the time of transmission or the change in time of transmission of signal 91 from first unit 100 to second unit 200, using clock 230. If animal 10 leaves area 20, second unit 200 generates warning signal 93 in the form of a sound wave audible to animal 10. Warning signal device 240 may be a transmitter transmitting warning signal 93 as a sound wave. If timing signal 91 and warning signal 93 are compatible, receiver 210 and warning signal device 240 may, in fact, be a single transceiver.

In the present embodiment, logic circuit 120 in first unit 100 provides signal 91A to transmitter 110 at a programmed interval using clock 130. Signal 91A drives transmitter 110 to propagate timing signal 91 at the programmed interval. Logic circuit 120 may be activated and deactivated using a switch 180.

First unit 100 may include a receiver 111, which receives warning signal 93 and transmits a signal 93B to control circuit 120. If warning signal 93 continues for a set period of time (indicating that animal 10 has not returned to area 20), then logic circuit 220 sends a signal to activate output device 150, which generates an output 95 to encourage animal 10 to return to area 20. Output device 150 may be, for example, a speaker that generates a sound audible to animal 10.

In an exemplary embodiment, clocks 130 and 230 are synchronized, either during manufacture with highly accurate clocks e.g., crystal oscillator driven clocks) or during use such as upon activation of one or both of first and second units or by periodic signals transmitted between first and second units. First unit generates timing signal 91 at a predetermined interval, such as every 100 ms, for example. The time of transmission for signal 91 is measured by dividing the difference between the time at which signal 91 is received and the time that it was transmitted (i.e., 0.100 seconds, 0.200 seconds, 0.300 seconds, etc) by the rate of propagation of signal 91 (approximately 1 foot per millisecond).

Figure 7:
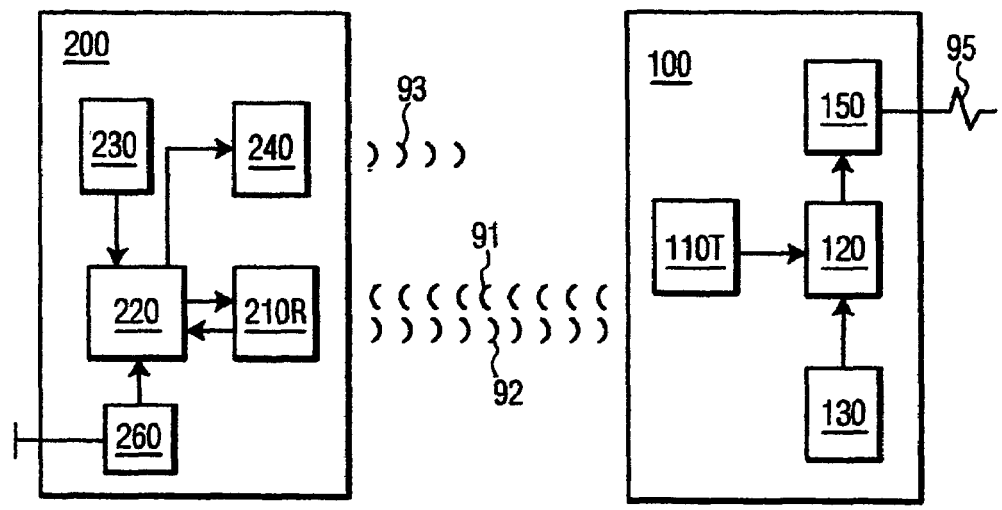
FIG. 7 is a block diagram of a system for containing an animal in a defined area according to another alterative exemplary embodiment of the invention.

Yet another alternative exemplary embodiment is shown in FIG. 7. First unit 100 is operatively associated with animal 10, and second unit 200 is positioned to locate area 20. As in the embodiment described above, a transceiver 110T in first unit 100 transmits timing signal 91. In this embodiment, a repeater 210R is provided in second unit 200, which receives timing signal 91 and repeats it as repeated signal 92. To avoid interference with timing signal 91, repeated signal 92 may be shifted in frequency from timing signal 91. Transceiver 110T receives repeated signal 92 and forwards it to logic circuit 120 in first unit 100. Logic circuit 120 measures the total time of transmission for timing signal 91 and repeated signal 92 using clock 130 and calculates the distance between first unit 100 and second unit 200. If animal 10 leaves area 20, as determined by the time of transmission corresponding to a distance greater than radius 21 for the containment area 20, then logic circuit 120 activates warning signal device 150 which generates warning output 95. Warning output 95 may be, for example, an electric pulse or a sound audible to animal 10.

Repeater 210R may also forward signal 91 to an optional logic circuit 220 in second unit 200. Logic circuit 220 may then measure the time of transmission for timing signal 91, and if the time of transmission corresponds to a distance approaching radius 21 of area 20 (e.g., two feet less than radius 21), then logic circuit 220 sends a signal to an output device 240, causing output device 240 to transmit a warning signal 93. Warning signal 93 may be, for example a sound wave audible to animal 10 but not to people. In FIG. 7 second unit 200 is equipped with a switch 260 for activating and deactivating the system. It should be understood that first unit 100 or second unit 200 or both may be so equipped.

In another exemplary embodiment, as shown in FIG. 8, a monitoring unit 300 communicates with first unit 100, second unit 200, or both. First unit 100 and second unit 200 communicate in any of the ways described above in which a warning signal 93 or other signal that is determined by the status of animal 10 relative to area 20 is transmitted by first unit 100 or second unit 200. For example, the unit which measures the time of transmission of timing signal 91 and calculates the distance between the first unit and the second unit, may generate a warning signal 93 such as an acoustic wave at a frequency audible to animal 10. Monitoring unit 300 may be configured to detect warning signal 93 and provide an alert to the person holding, wearing, or proximate monitoring unit 300. Alternatively, the unit that has calculated whether or not animal 10 is within the containment area 20 may generate a separate status signal that is detectable by monitoring unit 300. This status signal may be, for example, an rf signal or another type of communication signal such as a call from a wireless phone card or the like.

Third or monitoring unit 300 is held, worn, or located proximate a person and comprises a receiver 310 that receives warning signal 93 or another status signal and provides a discernable output at output device 320. Output device may be a light or device for making an audible sound or the like.

Optionally, the system may be turned on from monitoring unit 300. In this embodiment, a switch 330 on monitoring unit 300 is activated by a person when the system is to be activated, such as when the animal is let out of the house. Switch 330 then drives a transmitter 340 to propagate an activation signal 99, which causes first unit 100, second unit 200, or both to switch to an active state. Optionally, receiver 310 and transmitter 340 may be the same device.

Monitoring unit 300 may be used to detect warning signal 93 between first unit 100 and second unit 200 and provide status to a person using monitoring unit 300. It is also possible for monitoring unit 300 to be used more remotely from containment area 20. In this instance one of first and second units may incorporate a communication device suitable for communicating over some distance, such as an rf band, a phone card or the like.

Although this invention has been illustrated and described by reference to specific embodiments, it will be apparent to those skilled in the art that various changes and modifications may be made which clearly fall within the scope of the invention. The invention is intended to be protected broadly within the scope and spirit of the appended claims.

What is claimed is:

1. A system for containing an animal in a defined area, said system comprising first, second, and third communicating units:

one of said first and second units defining the containment area;

one of said first and second units being operatively associated with the animal;

one of said first and second units transmitting an ultrasonic signal at a periodic interval;

one of said first and second units receiving said ultrasonic signal, and determining a distance between said first and second units;

one of said first and second units generating a warning signal; and said third unit monitoring whether the animal is within the defined area.

2. The system of claim 1 wherein said third unit detects said warning signal and generates an output to indicate the status of the animal relative to the defined area.

3. The system of claim 1 wherein said third unit activates and deactivates at least one of said first and second units.

4. The system of claim 1 wherein said third unit detects a signal generated by said first unit or said second unit to convey status of the animal relative to the defined area to said monitoring unit.

5. The system of claim 3 wherein said warning signal is a sound audible to the animal.

6. A method of containing an animal, said method comprising the steps of:

defining an area by setting a radius from a first unit;

generating a timing signal at a first unit;

receiving said timing signal at a second unit;

measuring the time of transmission for said timing signal;

calculating a distance between said first unit and said second using said time of transmission;

generating a warning signal when said distance exceeds said radius; and displaying a status of the animal relative to the defined area on a monitoring unit.

7. The method of claim 6 further comprising the step of transmitting a status signal to the monitoring unit.

* * * * *